(12) United States Patent
Chen

(10) Patent No.: US 7,260,764 B2
(45) Date of Patent: Aug. 21, 2007

(54) MULTI-CHANNEL TRANSMISSION AND RECEPTION WITH BLOCK CODING IN A COMMUNICATION SYSTEM

(75) Inventor: Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 10/306,240

(22) Filed: Nov. 26, 2002

(65) Prior Publication Data

US 2004/0100937 A1    May 27, 2004

(51) Int. Cl.
*H03M 13/00* (2006.01)

(52) U.S. Cl. .................. 714/774; 714/751; 714/779

(58) Field of Classification Search ............ 714/774, 714/751, 752, 755, 754, 784, 756
See application file for complete search history.

(56) References Cited

U.S. PATENT DOCUMENTS

| | | | | |
|---|---|---|---|---|
| 5,701,302 | A * | 12/1997 | Geiger | 370/521 |
| 6,370,666 | B1 * | 4/2002 | Lou et al. | 714/751 |
| 6,480,521 | B1 * | 11/2002 | Odenwalder et al. | 375/130 |
| 6,678,856 | B1 * | 1/2004 | Jordan et al. | 714/755 |
| 6,728,920 | B1 * | 4/2004 | Ebersman | 714/752 |
| 6,742,155 | B2 * | 5/2004 | Bengough | 714/752 |
| 6,748,566 | B1 * | 6/2004 | Laroia et al. | 714/751 |

FOREIGN PATENT DOCUMENTS

EP    1032153    8/2000

OTHER PUBLICATIONS

Dabak et al., "A comparison of the open loop transmit diversity schemes for third generation wireless systems", *2000 IEEE Wireless Communication and Networking Conference*, vol. 1, pp. 437-442, Sep. 23, 2000.

* cited by examiner

*Primary Examiner*—Guy Lamarre
*Assistant Examiner*—Fritz Alphonse
(74) *Attorney, Agent, or Firm*—Thomas R. Rouse; Thien Nguyen; Roberta A. Young

(57) ABSTRACT

Techniques for transmitting and receiving multiple channels with block coding in a communication system are disclosed. In one aspect, a secondary broadcast channel is transmitted concurrently with parity information, encoded from a primary broadcast channel. In another aspect, a mobile station repurposes its receiving circuitry to receive one or more portions of the secondary broadcast channel after a sufficient portion of the primary broadcast channel is received without identified error. In another aspect, secondary broadcast channels associated with a plurality of primary broadcast channels are multiplexed onto a single secondary channel. Various other aspects are also presented. These aspects have the benefit of minimizing mobile station resources required to receive multiple broadcast channels, as well as reducing the complexity and channel resources required to transmit multiple broadcast channels.

17 Claims, 7 Drawing Sheets

MULTI-CHANNEL TRANSMISSION AND RECEPTION WITH BLOCK CODING IN A COMMUNICATION SYSTEM

FIELD

The present invention relates generally to communications, and more specifically to a novel and improved method and apparatus for multi-channel transmission and reception with block coding in a communication system.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Non-CDMA systems include the AMPS and GSM systems.

A typical wireless system provides point-to-point communication such as voice or data calls between one or more base stations and a mobile station. It is sometimes desirable to offer point-to-multipoint communications, such as broadcast information transmitted to one or more subscribing mobile stations. Broadcast services may include news, sports, weather updates, various audio and/or video presentations, various forms of text, data, and the like.

A broadcast information signal is, by design, not adapted for individual mobile station connections, but rather adapted for transmission to various mobile stations within a cell coverage area. Thus, techniques for optimizing point-to-point links, such as power control, are not as effective when identically applied to the broadcast signal. The signal quality received at various geographical locations in the cell coverage area will vary. Block coding techniques may be employed to provide a minimum quality of service to all the area served by a cell.

Due to the varying signal conditions experienced throughout a cell, it is possible to offer additional content to mobile stations that are in a relatively better reception area. The additional content may be additional text or data to go along with the base information signal embodied in the broadcast signal. Alternatively, additional information may be provided to enhance the quality of, for example, video or audio broadcasts. This additional, or secondary, information stream may be offered on one or more separate, parallel, code-division multiplex broadcast channels that have the same duration as the main broadcast channel that supports mobile stations in all areas of the cell. However, additional complexity, increased cost, increased power consumption, and/or decreased battery life may result if parallel receiving circuitry is deployed within mobile stations to take advantage of the secondary signal.

Furthermore, if multiple broadcast streams are offered for subscription within a cell, an efficient format for transmitting the multiple broadcast streams is desired. There is therefore a need in the art for transmitting and receiving multiple channels with block coding in a communication system.

SUMMARY

Embodiments disclosed herein address the need for transmitting and receiving multiple channels with block coding in a communication system. In one aspect, a secondary broadcast channel is transmitted concurrently with parity information, encoded from a primary broadcast channel. In another aspect, a mobile station repurposes its receiving circuitry to receive one or more portions of the secondary broadcast channel after a sufficient portion of the primary broadcast channel is received without identified error. In another aspect, secondary broadcast channels associated with a plurality of primary broadcast channels are multiplexed onto a single secondary channel. Various other aspects are also presented. These aspects have the benefit of minimizing mobile station resources required to receive multiple broadcast channels, as well as reducing the complexity and channel resources required to transmit multiple broadcast channels.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
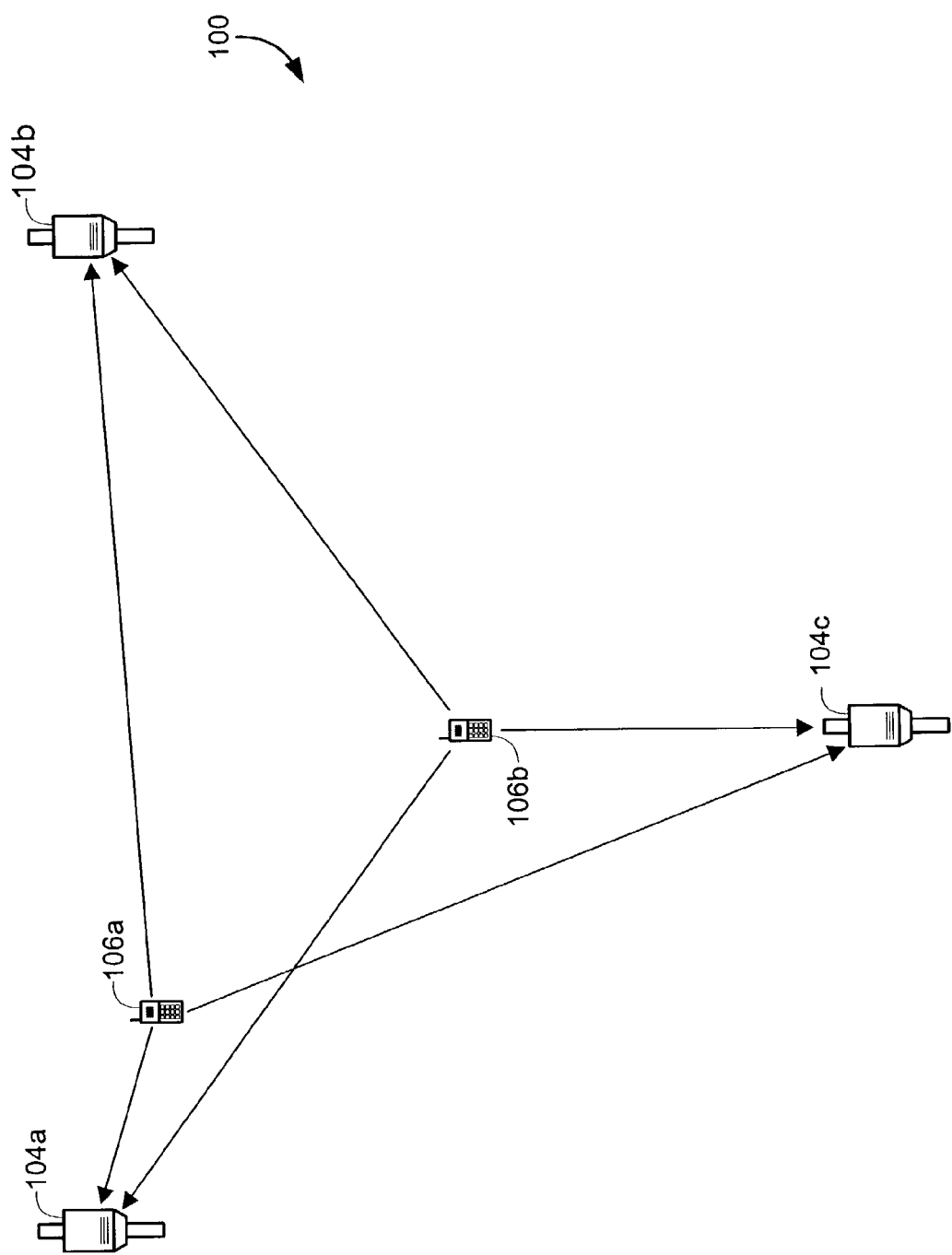
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). In an alternative embodiment, system 100 may also deploy any wireless standard or design other than a CDMA system, such as a GSM system.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station may be used interchangeably with the terms access point or Node B. The term mobile station may be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations may be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

During a typical CDMA voice call or data session, one or more base stations 104 communicate with a mobile station 106, in other words, a point-to-point connection. The quality of the communication channel between the mobile and base stations may vary with time, and depends on factors such as the distance between them, obstacles that block or reflect transmitted signals, and the number of other users whose signals generate interference. Variations in the communication channel may be offset using power control to increase or decrease the transmitted power from either the mobile station, the base station, or both. Power control is used to maintain a target frame error rate, or other quality metric, determined to provide an acceptable level of voice quality, or data throughput and delay, while minimizing the transmit power. Thus a mobile station that is close to a base station, for example, may use significantly less of the available transmit power of the base station than a mobile station that is farther away. Similarly, a mobile station that is experiencing a deep fade requires more transmit power from the base station than that mobile station's average requirement. Since the power from a given transmitter is typically limited, capacity of the system is generally optimized by providing the least amount of power to each mobile station required to maintain the desired data throughput/delay or voice quality and providing the saved power to the other mobile stations supported by the same base station. On the reverse link, transmitting the least amount of power by a mobile station through the use of power control reduces the interference experienced by base station receivers assigned to other mobile stations, or other multi-path components from this mobile station. Another benefit of the reverse link power control is that lowering RF transmit power also extend the talk/active time for a given mobile station battery charge. Power control techniques are well known in the art, and may be used effectively to regulate communication quality for point-to-point connections.

In contrast, a broadcast transmission allows communication between one or more base stations and a group of mobile stations, or point-to-multipoint communications. A broadcast transmission may be used to transmit content, such as data, text, news, movies, sporting events, and the like, from one or more serving base stations to one or more subscriber stations. All of the mobile stations subscribing to a particular broadcast channel may monitor and decode a single forward link signal containing the broadcast information. However, various subscriber stations may be distributed throughout the coverage areas of the cells, thus experiencing varying and sometimes uncorrelated levels of interference at any given time. As such, the instantaneous power required to transmit content to one subscriber station may be much greater than that required for transmission to all the other subscriber stations being served by the serving base station at one moment and the same is true for another subscriber station the next moment. One solution is to transmit the broadcast channel at the minimum power level required by the mobile station with the weakest reception at the moment. However, the necessary power for the subscriber station with the worst instantaneous reception typically is constantly high over time and reduces the benefits of power control. At the same time, the complexity and capacity costs associated with feedback from the mobile stations to the base stations is not reduced. A drawback of this approach is that the extra power required to reach the weakest mobile station may cause excessive interference, thus reducing capacity to serve other channels in the system, such as point-to-point voice and data calls, as well as other broadcast channels.

An alternate solution is to employ an outer block code on the broadcast channel to provide redundancy. An example of such a system is disclosed in co-pending U.S. patent application Ser. No. 09/933,912, entitled "METHOD AND SYSTEM FOR UTILIZATION OF AN OUTER DECODER IN A BROADCAST SERVICES COMMUNICATION SYSTEM", filed Aug. 20, 2001 and assigned to the assignee of the present invention. In this example, the outer code is used to regenerate erased information by the inner code, a process sometimes referred to as erasure decoding. Other examples of outer block coding include low-density parity code (LDPC), and other codes suitable for erasure decoding. The broadcast information is segmented into blocks, and each block is encoded. In an example embodiment the blocks consist of a number of frames of the broadcast information, referred to as systematic frames, and a number of frames of redundant information generated by the encoding process, referred to as parity frames. The systematic and parity information may be interleaved in any conceivable manner. In other embodiments, the information bits after outer encoding may be transmitted in frames containing both systematic bits and parity bits where the designators of systematic frame and parity frame do not apply. For clarity of discussion, an example embodiment is described herein with the systematic frames being transmitted first, followed by transmission of the parity frames.

If a mobile station receives all the systematic frames without error, or receives enough of the systematic or parity frames, then the some or all of the parity frames may be ignored. Alternatively, if a mobile station correctly receives enough of the outer-encoded bits, the rest of the bits in the block may be ignored. This may be the case for a particular mobile station that has a strong communication link—for example, the mobile station is close to a serving base station. In an example embodiment, for any systematic frame received in error, a correctly received parity frame may be substituted and used in block decoding to reproduce the transmitted broadcast information without error. Thus, with an encoding scheme deployed which produces a block of n frames, including k systematic frames and n-k parity frames, up to n-k frames of either type may be received with error without any resultant data loss. Therefore, if a certain quality level for broadcast communication is desired for all subscriber stations within a cell, the system may be designed such that the weakest mobile station generally receives the minimum number of frames correctly. In this case, all the mobile stations subscribing to the broadcast channel within the cell's coverage will be able to decode and reconstruct the transmitted broadcast information. Each mobile station may stop receiving frames once it has determined that k frames (either systematic or parity) have been received correctly.

Various mechanisms for determining if a frame is received correctly are known in the art. In an example embodiment, each frame is also encoded with a Cyclic Redundancy Check (CRC) code, which may be used to determine if an error is received within the frame. Note that a CRC is not 100% effective, so it is possible that occasionally a frame containing an error will be identified as having been received correctly. In that case, one or more errors received in the frame may introduce one or more errors in the resultant broadcast information stream received. If the error frame is used in block decoding to regenerate erased systematic frames, additional errors may be introduced. Various techniques may be deployed to reduce these effects. Using additional frames for decoding is one such technique, as disclosed in co-pending U.S. patent application Ser. No. 10/010,199 (hereinafter, the '199 application), entitled "ERASURE-AND-SINGLE-ERROR CORRECTION DECODER FOR LINEAR BLOCK CODES", filed Dec. 4, 2001, and assigned to the assignee of the present invention. A frame which is identified as containing an error, through the use of a CRC, for example, is called an erasure and not used in producing the decoded results. A frame which is identified as correct, although containing one or more errors, is referred to as an error frame. The technique disclosed allows the k systematic frames to be reconstructed using k+1 non-erased frames, even when one of the frames is an error frame. Various other techniques of reconstructing the transmitted broadcast information may be deployed within the scope of the present invention. In those cases, each subscribing mobile station may stop receiving frames from a block once the minimum number of frames have been received and identified as correct. In this example, a mobile station may stop receiving a block once k+1 non-erased frames are received.

Note that a broadcast signal may be transmitted through more than one base station in a system. A mobile station may be designed to allow reception of the broadcast signal from more than one base station and combine the results. The signals from each base station need not be uniform, i.e. transmitted with a minimum time separation, on the same channel, using the same spreading code, and so forth. However, mobile station design may be simplified when this is the case. For example, in a CDMA system, a mobile station may combine a broadcast signal from two or more base stations using a standard RAKE receiver in analogous fashion to a soft handoff, techniques for which are well known in the art. When mobile stations may receive the broadcast channel in soft handoff, the effect may be that mobile stations at the fringe of one cell's coverage area are no longer the weakest mobile stations, since they may combine energy from another neighboring cell. This may allow the transmit power of the broadcast channel to be further reduced, or the amount of redundancy in the block code to be reduced, or a combination of both. Those of skill in the art will readily apply these techniques with the principles disclosed herein within the scope of the present invention.

Note further that, although for clarity this discussion has used a CDMA system as an example system, block coding for broadcast signals may be applied to any type of system, and may be deployed within the scope of the present invention.

Figure 2:
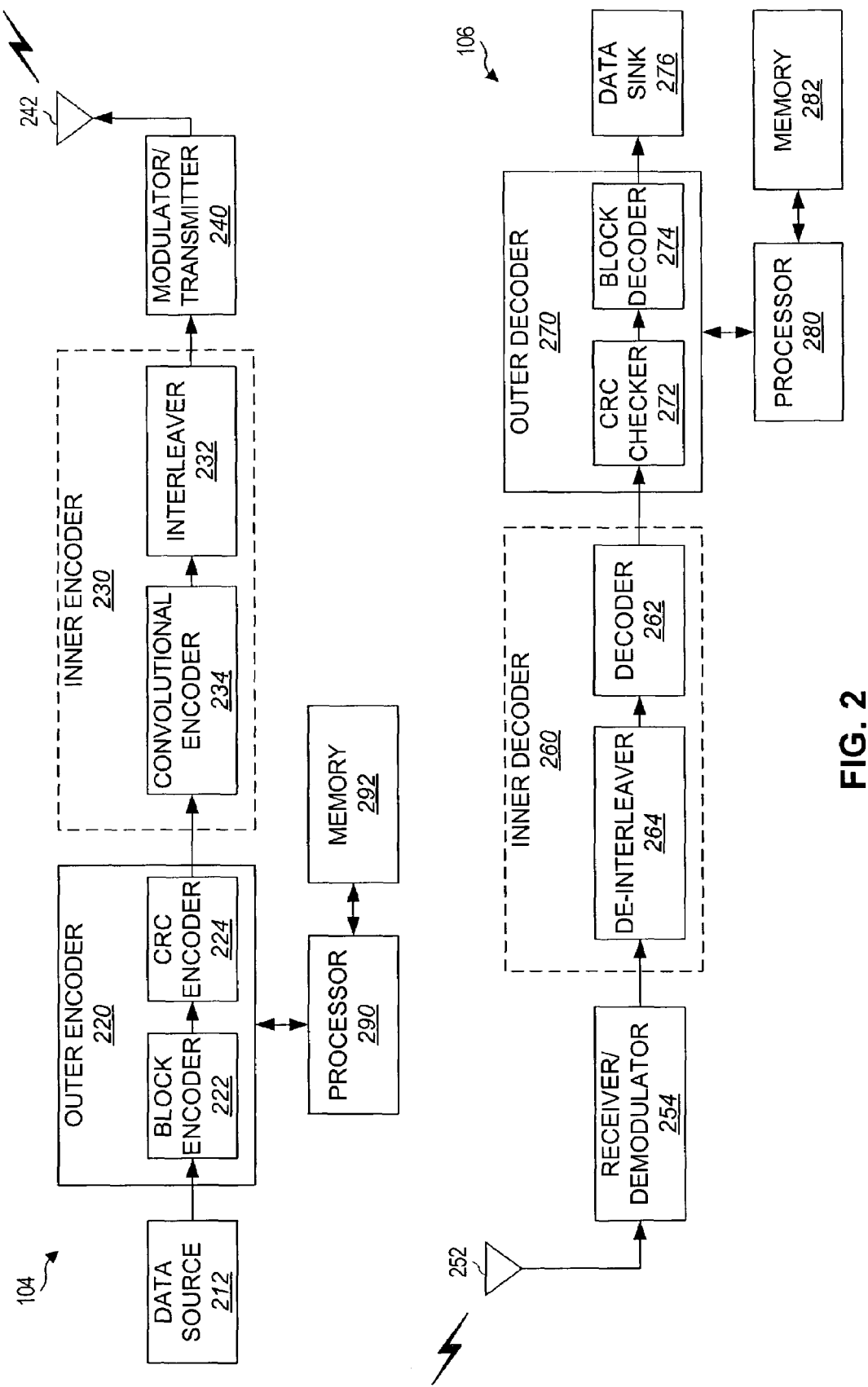
FIG. 2 depicts embodiments of a base station and a mobile station equipped for multi-channel transmission and reception, respectively.

FIG. 2 is a block diagram of an embodiment of a base station 104 communicating with an embodiment of a mobile station 106, equipped for transmitting and receiving block coded data, respectively. Base station 104 and mobile station 106 may be deployed with various aspects of the present invention described herein. In base station 104, a data source 212 provides data (e.g., in frames of a particular length) to an outer encoder 220 that includes a block encoder 222 and a CRC encoder 224. In this embodiment, data source 212 provides broadcast information intended for transmission to one or more subscribing mobile stations 106. Block encoder 222 receives the data from data source 212 and produces a block of data, comprised of systematic and parity frames. In this embodiment, k frames of data from data source 212 are encoded using a (n, k) block code, resulting in k systematic frames and n-k parity frames. Block encoder 222 may implement any linear block code such as a Reed-Solomon code (which is commonly used for data transmission), a Hamming code, a BCH (Bose, Chaudhuri, and Hocquenghem) code, or some other code. The inventive block coding and decoding techniques described herein may be used for any linear block code and may advantageously be used for systematic block codes. The frames are delivered to CRC encoder 224.

For each of the n frames, CRC encoder generates a set of CRC bits based on the data bits in the frame and appends the CRC bits to the end of the frame. The CRC bits included in each frame are used for error detection for the frame at the mobile station, as described above.

In an example embodiment, the block-coded data from outer encoder 220 is delivered to inner encoder 230. Inner encoder 230 may be used to provide additional error correction capability, as described below. However, those of skill in the art will recognize that the inventive techniques described herein may be used with a coding scheme using any type of inner coding, or no inner coding at all. Inner encoder 230 is thus optional, as represented by the dashed box. In addition, the data provided to outer encoder 220 may represent data that has been previously coded with any of one or more of a variety of encoding schemes (i.e., instead of "raw" data or information bits). Note that, in some embodiments, inner encoder 230 may already incorporate a CRC encoder. A CRC encoder included in inner encoder 230, or anywhere else in base station 104, for that matter, may be shared for use with outer encoder 220, i.e. CRC encoder 224.

Inner encoder 230 includes an interleaver 232 and a convolutional encoder 234. Convolutional encoder 234 codes the frames from outer encoder 220 in accordance with a particular convolutional code. Interleaver 232 shuffles (i.e., reorders) the encoded bits. The interleaving provides time diversity and disperses errors that may occur in bursts. Interleaving and convolutional encoding are techniques well known in the art.

The data from inner encoder 230 is then provided to a modulator/transmitter 240, which modulates (e.g., covers and spreads) the data to provide modulated data and further conditions (e.g., converts to one-or more analog signals, filters, amplifies, upconverts, etc.) the modulated data to provide a modulated signal suitable for transmission over a communication channel (e.g., wireless). An example embodiment is a wireless communication system, in which the modulated signal is a broadcast signal that is transmitted via antenna 242 to one or more mobile stations 106 that are subscribing to the broadcast information contained in the signal. In this embodiment, CDMA techniques are deployed, although the principles of the present invention apply to any type of modulation format.

Outer encoder 220 is shown connected to a processor 290. Processor 290 may be a general-purpose microprocessor, a digital signal processor (DSP), or a special purpose processor. Processor 290 may perform some or all of the functions of outer encoder 220, inner encoder 230, modulator/transmitter 240, as well as any other processing required by the base station. Processor 290 may be connected with special purpose hardware to assist in these tasks (details not shown). In addition, various data or voice applications may run on an additional processor within base station 104 (not shown), or may run on processor 290 itself. Processor 290 is connected with memory 292, which may be used for storing data as well as instructions for performing the various procedures and methods described herein. Those of skill in the art will recognize that memory 292 may be comprised of one or more memory components of various types, that may be embedded in whole or in part within processor 290.

For clarity, in FIG. 2, a single mobile station 106 is depicted receiving the modulated signal from base station 104, although multiple mobile stations may be receiving the broadcast signal. The transmitted modulated signal is received by the mobile station via antenna 252 and provided to a receiver/demodulator 254. Receiver/demodulator 254 conditions (e.g., filters, amplifies, and downconverts) the received signal and digitizes the conditioned signal to provide data samples. Receiver/demodulator 254 may further demodulate the data samples to provide demodulated data. Example demodulation techniques include deploying a RAKE receiver, decovering, despreading, combining, and the like. Demodulation techniques are well known in the art. An example embodiment demodulates signals formatted using CDMA modulation techniques, although any type of modulation and demodulation may be deployed within the scope of the present invention.

In this embodiment, the demodulated data is provided to an inner decoder 260 that includes a decoder 262 and a de-interleaver 264. Decoder 262 may perform Viterbi decoding, turbo decoding, or any other desired decoding technique. Decoder 262 decodes in response to the type of encoding deployed in convolutional encoder 234. De-interleaver 264 reorders the received bits in a complementary manner to the interleaving performed by interleaver 232. The de-interleaved data is decoded in decoder 262 and then provided to outer decoder 270. As with inner encoder 230, described above, inner decoder 230 may use any type of decoding scheme, or none at all. Hence, inner decoder is optional as indicated by the dashed outline.

Outer decoder 270 includes a CRC checker 272 and a block decoder 274. CRC checker 272 checks each received frame and provides an indication of whether the frame was received correctly or in error (i.e., erased). Note that, in some embodiments, inner decoder 260 may already incorporate a CRC checker. A CRC encoder included in inner encoder 260, or anywhere else in mobile station 106, for that matter, may be shared for use with outer decoder 270, i.e. CRC checker 272. The CRC-checked frames are provided to block decoder 274, which performs block decoding on the frames. As described above, if the k systematic frames are received correctly, block decoding is not mandatory and the broadcast information may be reconstructed from the k systematic frames. Alternatively, erasure-and-single-error or erasure-only correction block decoding may be performed, as described in the aforementioned '199 application. Reconstructed broadcast information is delivered to data sink 276, which may be any of a variety of devices or applications, known in the art.

Outer decoder 270 is shown connected to a processor 280. Processor 280 may be a general-purpose microprocessor, a digital signal processor (DSP), or a special purpose processor. Processor 280 may perform some or all of the functions of outer decoder 270, inner decoder 260, receiver/demodulator 254, as well as any other processing required by the mobile station. Processor 280 may be connected with special purpose hardware to assist in these tasks (details not shown). In addition, various data or voice applications may run on an additional processor within mobile station 106 (not shown), or may run on processor 280 itself. Processor 280 is connected with memory 282, which may be used for storing data as well as instructions for performing the various procedures and methods described herein. Those of skill in the art will recognize that memory 282 may be comprised of one or more memory components of various types, that may be embedded in whole or in part within processor 280.

In the system described above with respect to FIGS. 1 and 2, the broadcast channel may be block coded to provide adequate reception of the broadcast information to all the subscribing mobile stations within the cell. As described, mobile stations in the outer reaches of coverage may require all the encoded frames, both systematic and parity, to achieve the desired level of communication performance. However, as noted, mobile stations receiving a stronger signal, such as those nearer to the base station, may retrieve the broadcast information using fewer than the total available frames. Once a mobile station has received a sufficient number of frames correctly in a block, its receiving resources are no longer required to receive the broadcast signal, and may be repurposed to receive additional data. It may be desirable to provide enhanced broadcast data to mobile stations that are situated as such.

For example, a video or audio broadcast stream may be partitioned into two or more signals, where the first signal contains enough data to create a video or audio stream at a base quality level, and additional signals may carry data to enhance the quality of the audio or video. The first signal will be referred to herein as the primary broadcast channel, and a second signal will be referred to as the secondary broadcast channel. Broadcast information partitioned into two streams will be described for clarity, although those of skill in the art will recognize that more than two broadcast channels may be generated within the scope of the present invention. The two or more broadcast channels may contain data of any type, such as accompanying text or extra data. Audio and video streams, just described, are examples only. Thus, varying grades of service may be provided to different areas within a cell.

Figure 3:
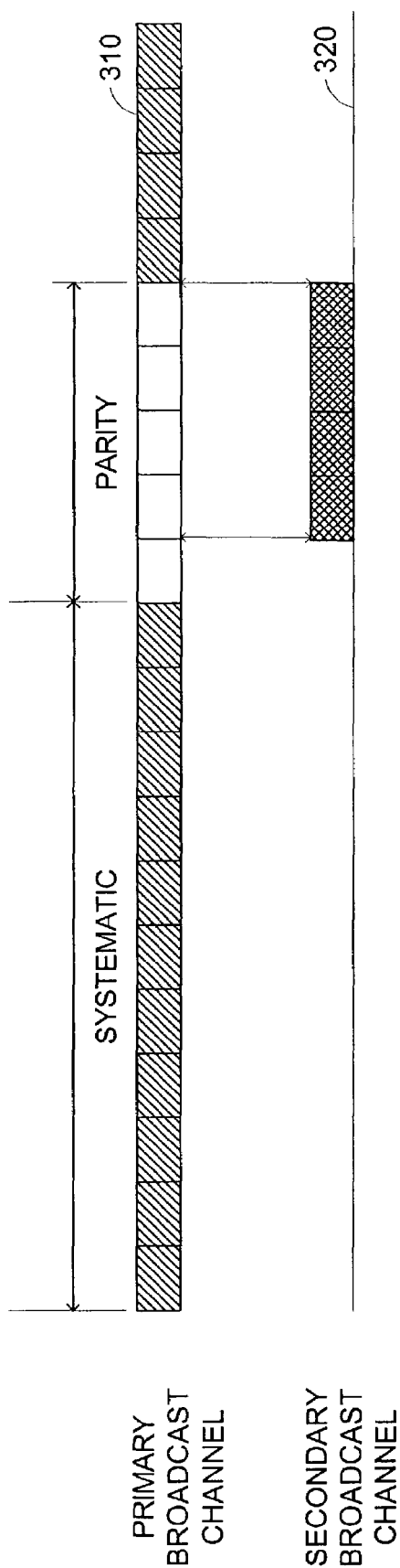
FIG. 3 depicts an example primary and secondary broadcast channel format.

FIG. 3 depicts an example transmit format for a primary and a secondary broadcast channel. The relative timing of the two channels, as shown, allows the reception of both channels at the mobile station without the need for redundancy in receiving hardware. In this example, a (16, 11) block code is deployed, although the principles described herein apply to block codes of any length, i.e. any (n, k) code. The secondary broadcast channel is transmitted during the latter four frames of the block, coinciding with transmission of four of the parity frames. This is consistent with a system embodiment in which k+1 frames are the minimum number of frames to perform erasure-and-single-error correction in the receiving mobile station. An alternate embodiment, in which erasure-only error correction is performed, would allow an additional frame to be transmitted on the secondary broadcast channel, prior to the four shown.

In the example of FIG. 3, the receiving mobile station may terminate reception of the primary broadcast channel once k+1 frames have been identified as correctly received, according to the CRC check. The mobile station may then repurpose its receiving components to receive frames on the secondary broadcast channel. Mobile stations requiring all n frames of a block to receive k+1 non-erasures will not be able to receive the secondary broadcast information during that block (i.e., mobile stations in the area of the cell just meeting the minimum service quality criteria). Mobile stations experiencing better quality reception may be able to receive one or more of the frames of the secondary broadcast channel, depending on how many of the primary broadcast frames are received before the minimum number of non-erasures is met, k+1 in this example (i.e., mobile stations in the area of the cell where the broadcast signal power is "too good", that is, the power supplied is greater than required for correct demodulation of the broadcast data).

The primary 310 and secondary 320 broadcast channels are transmitted concurrently, for at least a portion of the block period. As mentioned above, this technique may be applied to any type of system. In this embodiment, a Code Division Multiplex (CDM) system is deployed. The primary broadcast channel is transmitted using a first channelization code (such as a Walsh channel code), at a power level determined to provide adequate coverage throughout the cell. The secondary broadcast channel is transmitted using a secondary channelization code, and the power level may be set at a lower level to cover only a portion of the cell, if so desired. Thus, a mobile station may, depending on its location within the cell, receive both the primary and secondary channels with a single receive structure, since the secondary broadcast channel will be received only once the primary broadcast channel no longer requires monitoring. This may result in a less complex, and therefore a more cost and power effective, mobile station design (in contrast with a design requiring parallel decoding of two channels).

An additional benefit, when a CDM system is deployed, is that the channelization code for the secondary broadcast channel only needs to be allocated for a portion of the period. This allows reuse of channelization codes, which may be a benefit in situations where code space is the limiting factor rather than available transmit power. (An alternative, where multiple secondary broadcast channels, corresponding to multiple primary broadcast channels, are multiplexed on a single secondary channel using a single channelization code, is described below with respect to FIG. 6).

In the example of FIG. 3, subscribing mobile stations may be able to receive the primary broadcast channel as well as zero to four frames of secondary data, depending on their location within the cell. Only the best situated cells will be able to receive all four frames of secondary data. The next best will be able to receive the latter three. The next best will be able to receive the latter two. The last region where secondary data may be received will provide for reception of the last secondary frame only. As such, secondary data may be prioritized such that the highest priority secondary data is placed in the last frame, where the maximum number of mobile stations will be able to receive it. Each frame, moving earlier, may have progressively lower priority data, until the first frame, which has the smallest cell area in which the first frame is likely to be received. Any number of priority encoding schemes to order the secondary data may be deployed within the scope of the present invention.

Figure 4:
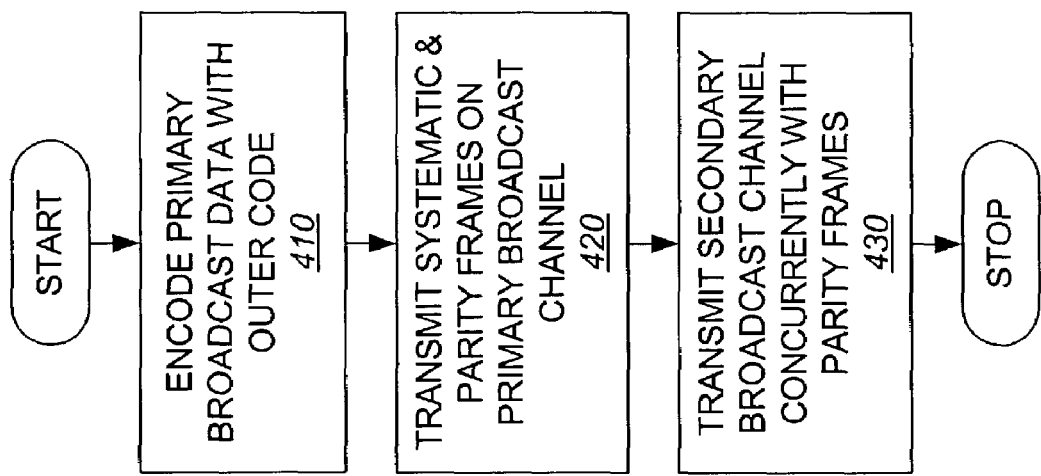
FIG. 4 is a flowchart of an embodiment of a method of transmitting primary and secondary broadcast channels.

FIG. 4 depicts an embodiment of a method of transmitting a broadcast channel comprising primary and secondary data. This method may be performed in a base station, such as base station 104 described above. The process begins in step 410. The primary data is encoded with an outer code. The outer code applied to the primary data produces systematic and parity frames in this embodiment. Note that alternate codes that do not produce systematic frames may be used (i.e., frames containing the uncoded data are not produced). Whether a frame is defined as systematic or parity is not essential, since the transmitted data may be constructed with a pre-determined number of correctly received frames (i.e. k frames, or k+1 frames, etc.). Those of skill in the art will readily apply the teachings herein to non-systematic block codes. Proceed to step 420.

In step 420, transmit the systematic and parity frames on a primary broadcast channel. In this embodiment, the data is transmitted using CDMA modulation and transmission techniques, with the primary broadcast channel assigned a particular channelization code (such as a Walsh code). Proceed to step 430.

In step 430, secondary broadcast data is formatted and transmitted on a secondary broadcast channel, concurrently with the parity frames of the primary broadcast channel (or a portion thereof). The secondary broadcast data may be encoded using any encoding technique, including none at all. In this embodiment, the secondary broadcast channel is transmitted using a channelization code other than that used by the primary broadcast channel. Those of skill in the art will recognize that the primary and secondary broadcast channels may be transmitted concurrently with data for various other users, i.e. voice and data channels, by assigning each channel a channelization code in accordance with CDMA transmission techniques that are well known in the art. Then the process stops. Note that the method of FIG. 4 may be performed periodically, for each block of primary and/or secondary broadcast data.

Figure 5:
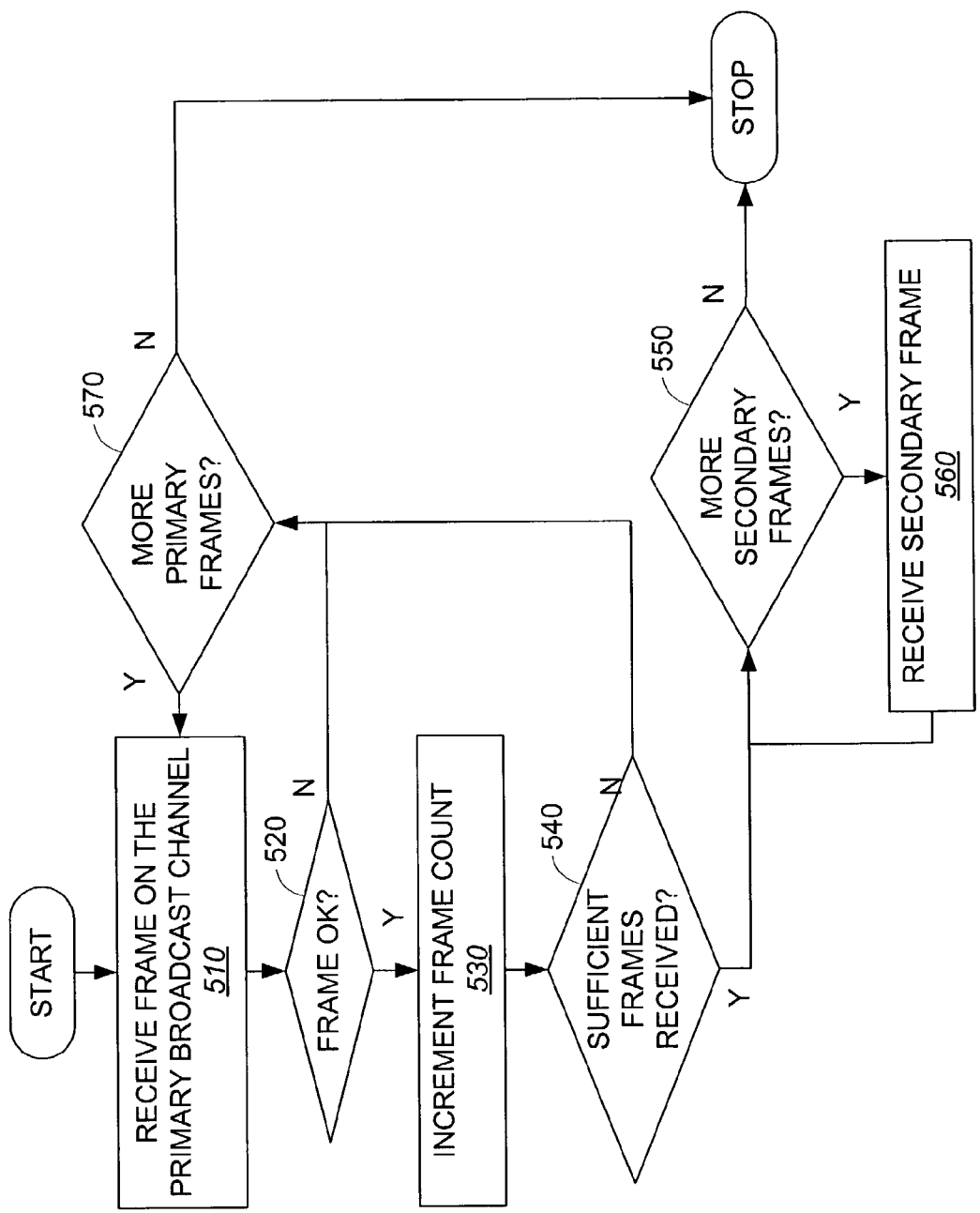
FIG. 5 is a flowchart of an embodiment of a method of receiving primary and secondary broadcast channels.

FIG. 5 depicts a flowchart of an embodiment of a method of receiving primary and secondary broadcast data. This method may be deployed in a mobile station, such as mobile station 106, described above. It may be used in conjunction with a data transmission method such as that described above with respect to FIG. 4.

The process starts in step 510, where a frame is received on the primary broadcast channel. The frame may be received according to any type of communication system or standard, although the example system is a CDMA system. Proceed to decision block 520.

In decision block 520, if the frame is identified as having been received correctly, proceed to step 530. If the frame is received in error, an erasure is declared, and the process proceeds to decision block 570. In this embodiment, a CRC is used to test for errors in the received frame. If the CRC fails, an erasure is declared. If the CRC passes, then the frame is identified as received correctly. As described above, there may still be an error in a frame identified as correctly received. The effects of a false positive may be mitigated by requiring additional frames for decoding (i.e. requiring k+1 frames to perform error correction, as opposed to requiring k frames for erasure only decoding). Any alternate method of identifying errors in the received frames may be deployed in decision block 520.

In decision block 570, if there are additional primary broadcast channel frames to receive, proceed back to step 510 to receive the next frame. If there are no additional primary broadcast channel frames to receive, then the process stops. As described further below, this branch will be taken when the number of non-erasure frames received is less than the required amount (i.e. k+1 frames, if erasure and single error detection is deployed). The process may be repeated for the next block of broadcast channel data.

In step 530, since the frame was identified as having been received correctly, a frame count variable is incremented. The frame count variable may be used to determine if the minimum number of non-erasure frames has been received. Proceed to decision block 540.

In decision block 540, if the minimum number of non-erasure frames has been received, proceed to decision block 550. If not, proceed to decision block 570, described above, to determine if additional primary broadcast channel frames of block are yet to be received. If the minimum number of non-erasure frames has been received, proceed to decision block 550.

Recall that the secondary broadcast channel is transmitted during the parity frame transmission portion of the primary broadcast channel. Decision block 550 is reached if the minimum number of non-erasure frames has been received. In weaker coverage areas of the cell, the entire block may have been transmitted before this threshold is reached. In that case, the secondary broadcast channel will also have completed for the current period, as shown in FIG. 3. In decision block 550, if additional secondary broadcast channel frames are yet to be received, proceed to step 560. In step 560, receive the next secondary broadcast channel frame, then return to decision block 550 to check for more secondary frames. Once the secondary frames are completed for the block period, the process may stop.

Figure 6:
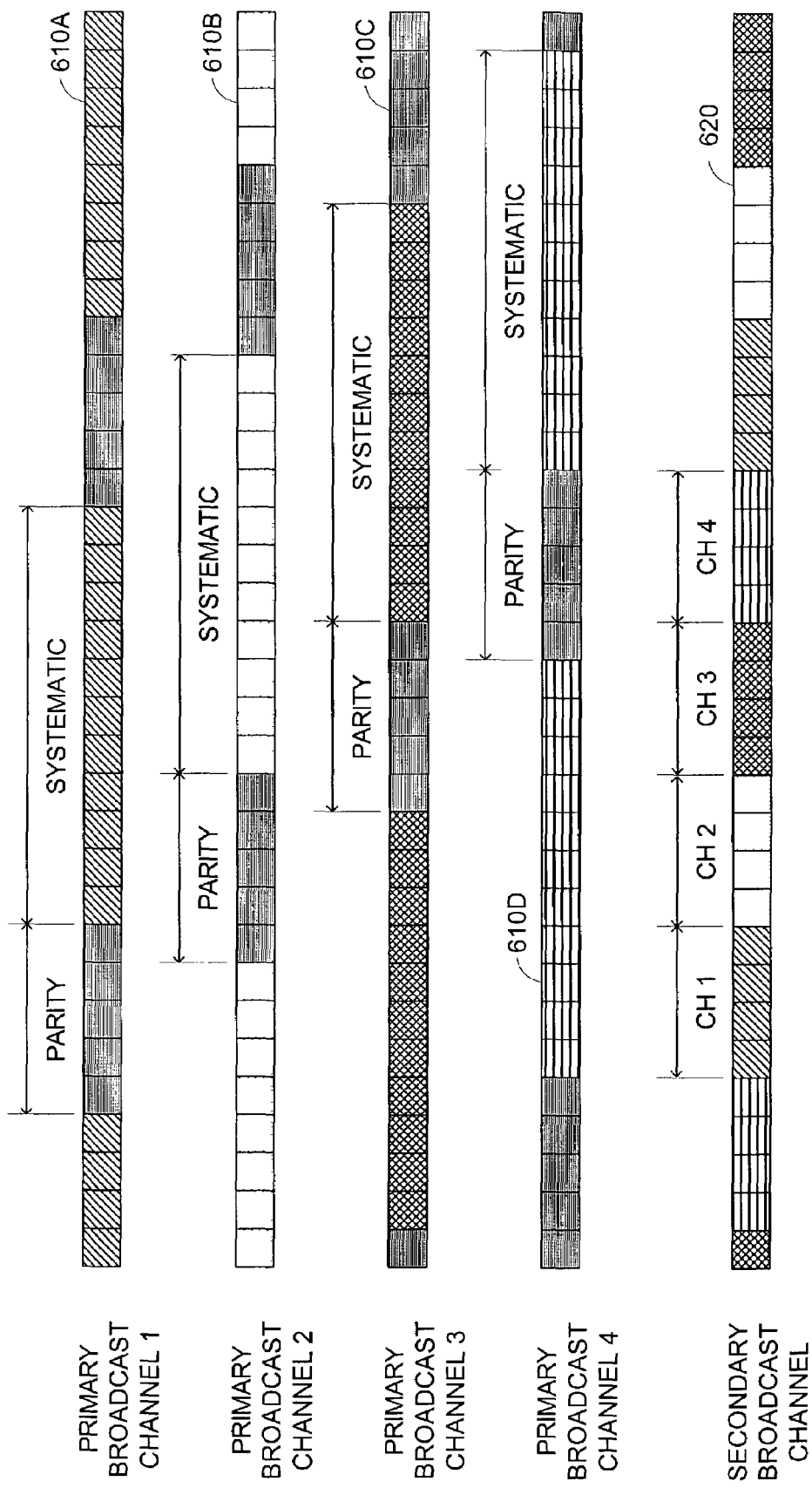
FIG. 6 depicts an example multiple broadcast channel format, including a primary broadcast channel for each broadcast channel and a time-multiplexed secondary channel comprising secondary broadcast channels for each broadcast channel.

FIG. 6 depicts an example transmit format for multiple primary and secondary broadcast channels. In this example, four primary broadcast channels 610A-610B are simultaneously transmitted. A mobile station may subscribe to one of the broadcast channels, in the same manner as described above with respect to FIGS. 3-5. Supplemental information may also be provided corresponding to each primary broadcast channel, which will be available within regions of the cell with better signal quality, as described above. However, in this example, the supplemental information (or secondary broadcast channel) for each primary broadcast channel is time-multiplexed onto a single secondary channel 620.

Similar to the format of FIG. 3, the relative timing between a primary broadcast channel and the corresponding supplement of that channel on the secondary channel allows the reception of both the primary and secondary data at the mobile station without the need for redundancy in receiving hardware. As before, in this example, a (16, 11) block code is deployed for each broadcast channel, although the principles described herein apply to block codes of any length, i.e. any (n, k) code. Each supplement of a primary broadcast channel is transmitted on the secondary channel during the latter four frames of the corresponding primary broadcast channel block, coinciding with transmission of four of the parity frames. This is consistent with a system embodiment in which k+1 frames are the minimum number of frames to perform erasure-and-single-error correction in the receiving mobile station. Those of skill in the art will readily adapt these principles to any number of primary and secondary channels, as well as any type or length of block coding techniques.

It can be seen in FIG. 6 that a mobile station, tuned to any one of the four broadcast channels, may repurpose its receiving circuitry to receive corresponding supplemental information transmitted on the secondary channel once the required number of frames of the primary broadcast channel are received correctly. The block transmission period of each of the four broadcast channels is offset in time by four frames, so that during transmission of the last four parity frames from a broadcast channel, the corresponding supplemental information is transmitted on the secondary channel. This format allows the secondary channel to be shared by mobile stations subscribing to any of the four broadcast channels, and only a single channelization code needs to be used. The features described above with respect to FIGS. 3-5 are also available to embodiments deployed in accordance with the format of FIG. 6, in addition to the sharing of the secondary channel, as just described.

Figure 7:
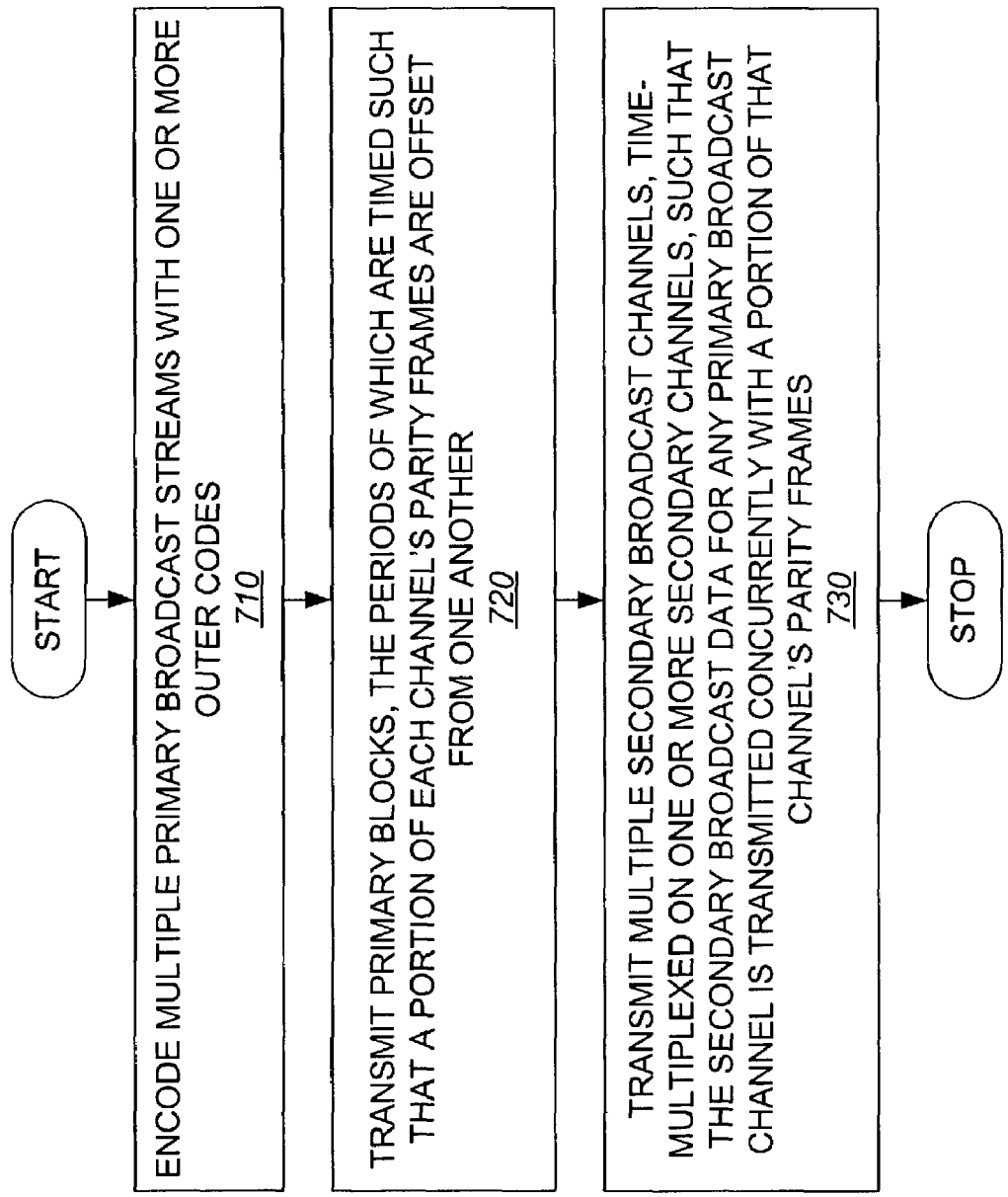
FIG. 7 is a flowchart of an embodiment of a method of transmitting multiple broadcast channels, including primary and secondary broadcast channels.

FIG. 7 depicts an embodiment of a method of transmitting multiple broadcast channels comprising primary and secondary data. The primary data is transmitted on multiple primary broadcast channels, and the secondary (or supplemental) information is transmitted on one or more time-shared secondary channels. The format shown in FIG. 6 is one example format that is suitable for use with this method. This method may be performed in a base station, such as base station 104 described above.

The process begins in step 710. The primary data of each of the multiple broadcast channels is encoded with an outer code. The outer code applied to the primary data produces systematic and parity frames for that broadcast channel. As in the method depicted in FIG. 4, alternate codes that do not produce systematic frames may be used (i.e., frames containing the uncoded data are not produced). Whether a frame is defined as systematic or parity is not essential, since the transmitted data may be constructed with a pre-determined number of correctly received frames (i.e. k frames, or k+1 frames, etc.). Those of skill in the art will readily apply the teachings herein to non-systematic block codes. Proceed to step 720.

In step 720, transmit the systematic and parity frames on each of a plurality of primary broadcast channels. In this embodiment, the data is transmitted using CDMA modulation and transmission techniques, with each primary broadcast channel assigned a particular channelization code (such as a Walsh code). The period of each primary broadcast channel transmission is offset by a certain amount of time, to produce at least a portion of each parity section that is offset from parity sections of the other broadcast channels. This is to allow for time-sharing of the associated secondary channels. An example format depicting this time offset is shown in FIG. 6. Proceed to step 730.

In step 730, secondary broadcast data associated with one of the multiple broadcast channels is formatted and transmitted on a secondary broadcast channel, concurrently with the parity frames of the corresponding primary broadcast channel (or a portion thereof). The secondary broadcast channel is time-multiplexed, with multiple supplemental channels for multiple broadcast channels sharing the channel. There may be more than one time-multiplexed supplemental channel. The transmission of the supplemental information for a broadcast channel on the secondary channel is coincidental to a portion of the associated primary parity frames. As with the method of FIG. 4, the secondary broadcast data may be encoded using any encoding technique, including none at all. In this embodiment, the secondary broadcast channel is transmitted using a channelization code other than that used by the primary broadcast channel. Those of skill in the art will recognize that the primary and secondary broadcast channels may be transmitted concurrently with data for various other users, i.e. voice and data channels, by assigning each channel a channelization code in accordance with CDMA transmission techniques that are well known in the art. Then the process stops. Note that the method of FIG. 7 may be performed periodically, for each block of primary and/or secondary broadcast data.

A mobile station, such as mobile station 106, may receive and decode a broadcast channel formatted according to the method described with respect to FIG. 7, or with the example format depicted in FIG. 6. Although the multiple primary broadcast channels are transmitted such that the associated secondary broadcast channels may be received using a multiplexed secondary channel, the mobile station may use the same method for receiving a broadcast channel as it would in a system without a multiplexed secondary channel. Thus, the mobile station needs only to have the parameters for receiving the primary and secondary channels to which it is subscribed. Receiving those channels may proceed using a method such as that described above with respect to FIG. 5. For example, any one of the primary broadcast channels and its associated segment of the secondary broadcast channel, as shown in FIG. 6, may be treated the same as a primary and secondary broadcast channel as shown in FIG. 3, from the mobile station's perspective.

Various example embodiments discussed above have, for clarity, assumed the use of (n, k) block codes, where a set of systematic frames is transmitted followed by the corresponding set of parity frames for the block. Those of skill in the art will recognize that this is for example only, and does not limit the scope of the present invention. As mentioned above, a code block may consist of any of various types of frames, whether or not systematic frames are produced. Furthermore, the frames may be interleaved using any conceivable interleaving technique. For example, to mitigate the effects of bursty errors that may degrade the quality of blocks of length n, multiple coded blocks may be interleaved. An example of such a system is disclosed in co-pending U.S. patent application Ser. No. 09/976,591, entitled "METHOD AND SYSTEM FOR REDUCTION OF DECODING COMPLEXITY IN A COMMUNICATION SYSTEM", filed Oct. 12, 2001, and assigned to the assignee of the present invention. In this example, L sets of broadcast data are encoded into L coded blocks. One frame from each of the L coded blocks is transmitted sequentially, resulting in L*k systematic frames being transmitted followed by L*(n-k) parity frames. The effect of this interleaving is to spread the frames of each block over a longer time duration, thus combating interference of longer burst errors than would be possible without the interleaving. Those of skill in the art will readily adapt the methods, formats, and embodiments described herein to these and other conceivable interleaving schemes in accordance with the principles disclosed herein.

As described above, the block codes described above are examples only. Any block code known in the art may be adapted for use within the scope of the present invention. For example, another class of codes, Low Density Parity Check (LDPC) codes, is known in the art and may be used advantageously in the embodiments disclosed herein. LDPC codes provide good performance, outperforming turbo codes in certain situations. Although LDPC decoders can be complicated in general, they may be implemented efficiently when erasures are used as described above. LDPC codes are yet another example of suitable codes, and future block coding developments are anticipated that will also fall within the scope of the present invention.

It should be noted that in all the embodiments described above, method steps may be interchanged without departing from the scope of the invention. The descriptions disclosed herein have in many cases referred to signals, parameters, and procedures associated with CDMA standards, but the scope of the present invention is not limited as such. Those of skill in the art will readily apply the principles herein to various other communication systems. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   one or more block coders for receiving blocks from a plurality of first data streams and encoding the blocks to produce a plurality of first and second portions of block coded data corresponding to the plurality of first data streams, the second portions of block coded data being unnecessary to reconstruct the first data streams when the first portions of block coded data are correctly received; and
   a transmitter for:
      transmitting a plurality of channels comprising the plurality of first and second portions of block coded data, the transmission of the plurality of second portions of block coded data offset from one another; and
      transmitting a multiplexed channel comprising a sequence of portions of a plurality of second data streams associated with the plurality of first data streams wherein each of the plurality of second data streams comprises supplemental data to enhance the associated one of the plurality of first data streams, the timing of transmission of each second data stream aligned with the second portion of block coded data of the corresponding first data stream.

2. The apparatus of claim 1, further comprising one or more CRC encoders for encoding frames of the block coded data.

3. The apparatus of claim 1, wherein the one or more block coders are Reed-Solomon encoders.

4. The apparatus of claim 1, wherein the one or more block coders are LDPC encoders.

5. The apparatus of claim 1, wherein one or more of the plurality of second data streams are transmitted in increasing order of priority.

6. A wireless communication device comprising:
   one or more block coders for receiving blocks from a plurality of first data streams and encoding the blocks to produce a plurality of first and second portions of block coded data corresponding to the plurality of first data streams, wherein the second data stream comprises supplemental data to enhance the first data stream, the second portions of block coded data being unnecessary to reconstruct the first data streams when the first portions of block coded data are correctly received; and
   a transmitter for:
      transmitting a plurality of channels comprising the plurality of first and second portions of block coded data, the transmission of the plurality of second portions of block coded data offset from one another; and
      transmitting a multiplexed channel comprising a sequence of portions of a plurality of second data streams associated with the plurality of first data streams, the timing of transmission of each second data stream aligned with the second portion of block coded data of the corresponding first data stream.

7. A wireless communication system, including a wireless communication device, comprising:
   one or more block coders for receiving blocks from a plurality of first data streams and encoding the blocks to produce a plurality of first and second portions of block coded data corresponding to the plurality of first data streams, wherein the second data stream comprises supplemental data to enhance the first data stream, the second portions of block coded data being unnecessary to reconstruct the first data streams when the first portions of block coded data are correctly received; and
   a transmitter for:
      transmitting a plurality of channels comprising the plurality of first and second portions of block coded data, the transmission of the plurality of second portions of block coded data offset from one another; and
      transmitting a multiplexed channel comprising a sequence of portions of a plurality of second data streams associated with the plurality of first data streams, the timing of transmission of each second data stream aligned with the second portion of block coded data of the corresponding first data stream.

8. A method of transmitting a broadcast signal including primary and secondary data streams, comprising:
   block encoding a block of the primary data stream to produce first and second portions of block coded data;
   transmitting on a first channel the first portion of block coded data during a first portion of a block period;
   transmitting on the first channel the second portion of block coded data during the second portion of the block period; and
   transmitting on a second channel a portion of the secondary data stream concurrently with the second portion of the block period, wherein the secondary data stream comprises supplemental data to enhance the primary data stream, the second portion of block coded data being unnecessary to reconstruct the first data stream when the first portion of block coded data is correctly received.

9. The method of claim 8, further comprising CRC encoding frames of the block coded data prior to transmission.

10. The method of claim 8, wherein the portions of the secondary data stream are transmitted in increasing order of priority.

11. A method of transmitting a plurality of broadcast signals, each including primary and secondary data streams, comprising:
   block encoding blocks of the plurality of primary data streams to produce a plurality of first and second portions of block coded data, the second portions of block coded data being unnecessary to reconstruct the primary data streams when the first portions of block coded data are correctly received and wherein the secondary data stream comprises supplemental data to enhance the primary data stream;

transmitting on a plurality of first channels the plurality of first and second portions of block coded data during a plurality of first and second portions of a block period, respectively, the plurality of block periods offset from each other; and transmitting on a second channel, time-multiplexed, the plurality of secondary data streams, such that each secondary data stream is transmitted concurrently with the transmission of the associated second portion of block coded data.

12. The method of claim 11, further comprising CRC encoding frames of the block coded data prior to transmission.

13. The method of claim 11, wherein portions of the secondary data stream are transmitted in increasing order of priority.

14. An apparatus, operable with a broadcast signal including primary and secondary data streams, comprising:
   means for block encoding a block of the primary data stream to produce first and second portions of block coded data;
   means for transmitting on a first channel the first portion of block coded data during a first portion of a block period;
   means for transmitting on the first channel the second portion of block coded data during the second portion of the block period; and
   means for transmitting on a second channel a portion of the secondary data stream concurrently with the second portion of the block period, wherein the secondary data stream comprises supplemental data to enhance the primary data stream, the second portion of block coded data being unnecessary to reconstruct the first data stream when the first portion of block coded data is correctly received.

15. An apparatus, operable with a plurality of broadcast signals, each including primary and secondary data streams, comprising:
   means for block encoding blocks of the plurality of primary data streams to produce a plurality of first and second portions of block coded data, the second portions of block coded data being unnecessary to reconstruct the primary data streams when the first portions of block coded data are correctly received and wherein the secondary data stream comprises supplemental data to enhance the primary data stream;
   means for transmitting on a plurality of first channels the plurality of first and second portions of block coded data during a plurality of first and second portions of a block period, respectively, the plurality of block periods offset from each other; and
   means for transmitting on a second channel, time-multiplexed, the plurality of secondary data streams, such that each secondary data stream is transmitted concurrently with the transmission of the associated second portion of block coded data.

16. A wireless communication system, operable with a broadcast signal including primary and secondary data streams, comprising:
   means for block encoding a block of the primary data stream to produce first and second portions of block coded data;
   means for transmitting on a first channel the first portion of block coded data during a first portion of a block period;
   means for transmitting on the first channel the second portion of block coded data during the second portion of the block period; and
   means for transmitting on a second channel a portion of the secondary data stream concurrently with the second portion of the block period, wherein the secondary data stream comprises supplemental data to enhance the primary data stream, the second portion of block coded data being unnecessary to reconstruct the first data stream when the first portion of block coded data is correctly received.

17. Processor readable media, operable with a broadcast signal including primary and secondary data streams, and operable to perform the following steps:
   block encoding a block of the primary data stream to produce first and second portions of block coded data;
   transmitting on a first channel the first portion of block coded data during a first portion of a block period;
   transmitting on the first channel the second portion of block coded data during the second portion of the block period; and
   transmitting on a second channel a portion of the secondary data stream concurrently with the second portion of the block period, wherein the secondary data stream comprises supplemental data to enhance the primary data stream, the second portion of block coded data being unnecessary to reconstruct the first data stream when the first portion of block coded data is correctly received.

* * * * *